(12) United States Patent
Koonce et al.

(10) Patent No.: US 6,514,572 B1
(45) Date of Patent: Feb. 4, 2003

(54) POLYURETHANE FILMS PREPARED BY ELECTRODEPOSITION FROM POLYURETHANE DISPERSIONS

(75) Inventors: William A. Koonce, Pearland, TX (US); Debkumar Bhattacharjee, Lake Jackson, TX (US); Michael Y. Gribble, Wollerau (CH); James A. McIntyre, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/548,915

(22) Filed: Apr. 13, 2000

Related U.S. Application Data

(60) Provisional application No. 60/129,277, filed on Apr. 14, 1999.

(51) Int. Cl.$^7$ .............................. B05D 1/04; B05D 3/02; H05C 1/00
(52) U.S. Cl. .................. 427/458; 427/372.2; 427/385.5
(58) Field of Search .......................... 427/372.2, 385.5, 427/458

(56) References Cited

U.S. PATENT DOCUMENTS

| | | | |
|---|---|---|---|
| 2,968,575 A | 1/1961 | Mallonee et al. | 106/287 |
| 3,148,173 A | 9/1964 | Axelrood | 260/75 |
| 3,178,310 A | 4/1965 | Berger et al. | 117/142 |
| 3,210,302 A | 10/1965 | Bowell et al. | 260/18 |
| 3,294,724 A | 12/1966 | Axelrood | 260/29.2 |
| 3,360,599 A | 12/1967 | Nyberg et al. | 264/216 |
| 3,401,133 A | 9/1968 | Grace et al. | 260/29.2 |
| 3,410,817 A | 11/1968 | McClellan et al. | 260/29.2 |
| 3,437,624 A | 4/1969 | Dawn et al. | 260/29.2 |
| 3,488,272 A | 1/1970 | Frisch et al. | 204/181 |
| 3,503,917 A | 3/1970 | Burks | 260/29.6 |
| 3,563,943 A | 2/1971 | Davis et al. | 260/29.2 |
| 3,826,768 A | 7/1974 | Suzuki et al. | 260/29.2 |
| 3,919,173 A | 11/1975 | Coyner et al. | 260/77.5 |
| 3,997,592 A | 12/1976 | Aufdermarsh | 260/471 |
| 4,046,729 A | 9/1977 | Scriven et al. | 260/29.2 |
| 4,066,591 A | 1/1978 | Scriven et al. | 260/29.2 |
| 4,119,602 A | 10/1978 | Isgur et al. | 260/29.6 |
| 4,123,403 A | 10/1978 | Warner et al. | 260/29.2 |
| 4,147,679 A | 4/1979 | Scriven et al. | 260/29.2 |
| 4,292,226 A | 9/1981 | Wenzel et al. | 260/29.2 |
| 4,431,763 A | 2/1984 | Reed | 524/389 |
| 4,433,095 A | 2/1984 | Hombach et al. | 524/563 |
| 4,442,259 A | 4/1984 | Isgur et al. | 524/839 |
| 4,444,976 A | 4/1984 | Rabito | 528/60 |
| 4,501,852 A | 2/1985 | Markusch et al. | 524/591 |
| 4,507,413 A | 3/1985 | Thoma et al. | 524/42 |
| 4,540,633 A | 9/1985 | Kucera et al. | 428/423.1 |
| 4,558,090 A | 12/1985 | Drexler et al. | 524/591 |
| 4,742,095 A | 5/1988 | Markusch et al. | 523/322 |
| 5,037,864 A | 8/1991 | Anand et al. | 523/348 |
| 5,043,381 A | 8/1991 | Coogan et al. | 524/591 |
| 5,071,904 A | 12/1991 | Martin et al. | 524/458 |
| 5,185,200 A | 2/1993 | Tirpak et al. | 428/288 |
| 5,227,422 A | 7/1993 | Mitsuji et al. | 524/457 |
| 5,281,655 A | 1/1994 | Mitsuji et al. | 524/507 |
| 5,372,875 A | 12/1994 | Markusch et al. | 428/228 |
| 5,494,960 A | 2/1996 | Rolando et al. | 524/591 |
| 5,539,021 A | 7/1996 | Pate et al. | 523/335 |
| 5,569,706 A | 10/1996 | Jacobs et al. | 524/591 |
| 5,589,563 A | 12/1996 | Ward et al. | 528/44 |
| 5,688,863 A | 11/1997 | Kirchmeyer et al. | 524/839 |
| 5,830,541 A | 11/1998 | Carswell et al. | 427/475 |

FOREIGN PATENT DOCUMENTS

| | | | |
|---|---|---|---|
| DE | 197 08 451 A1 | 3/1997 | 75/4 |
| EP | 0 167 188 A | 1/1986 | |
| EP | 0 279 198 | 8/1988 | 18/10 |
| GB | 1 243 604 A | 8/1971 | |
| GB | 1 432 112 | 4/1976 | |
| JP | 49047427 A | 11/1975 | |
| JP | 55052359 A | 4/1980 | |
| JP | 02204032 | 8/1990 | |
| JP | 05005094 | 1/1993 | |
| JP | 09165425 | 6/1997 | |
| JP | 10161397 | 6/1998 | |
| WO | 95/08583 | 3/1995 | |
| WO | 97/42247 | 11/1997 | |
| WO | WO 98/25747 | 6/1998 | B29C/41/00 |
| WO | 98/31760 | 7/1998 | |
| WO | WO 98/41522 | 9/1998 | |
| WO | 98/41554 | 9/1998 | |
| WO | 99/23129 | 5/1999 | |

*Primary Examiner*—Patrick D. Niland

(57) ABSTRACT

A process for preparing polyurethane films is disclosed, comprising electrodepositing the film onto a substrate from a polyurethane dispersion. One advantage of the electrodeposition process of the present invention is that there is no need for an additional step to remove coagulants from the films, as with conventional coagulation processes. Another advantage is that in using electrodeposition, the amount of water that must be removed during a dewatering step is minimized. A third advantage is that the resulting film demonstrates much greater uniformity in thickness as compare to films prepared by conventional coagulation techniques. The present invention has applicability in, for example, medical applications.

11 Claims, No Drawings

POLYURETHANE FILMS PREPARED BY ELECTRODEPOSITION FROM POLYURETHANE DISPERSIONS

This application claims the benefit of U.S. Ser. No. 60/129,277 filed Apr. 14, 1999.

BACKGROUND OF THE INVENTION

This invention relates to polyurethane films and more particularly relates to polyurethane films prepared from aqueous dispersions.

While ostensibly reactive with water, it has long been known that polyisocyanate polymers can be used to prepare aqueous polyurethane dispersions. Polyurethane dispersions are generally prepared by chain extending the reaction product of an organic diisocyanate or polyisocyanate and an organic compound having two or more active hydrogen atoms such as polyalkylene ether glycols, poly(alkylene ether-alkylene thioether) glycols, alkyd resins, polyesters and polyester amides, often using an organic solvent. The diisocyanate is used in stoichiometric excess so that the reaction product, also referred to as a polyurethane/urea/thiourea prepolymer, is isocyanate terminated. Examples of polyurethane prepolymer preparations are described in U.S. Pat. Nos. 3,178,310, 3,919,173, 4,442,259, 4,444,976, and 4,742,095, among others.

Polyurethane dispersions are reported as being useful for preparing such diverse materials as: coatings and bonds in U.S. Pat. No. 4,292,226; flexible solvent barriers in U.S. Pat. No. 4,431,763; adhesives in U.S. Pat. No. 4,433,095; and films in U.S. Pat. No. 4,501,852. Films, or rather the process of dipping to make a film, can be a part of the processes for making many articles. Examples of film applications include exam gloves, organ bags, condoms, ostomy bags, and the like. While it is known that such applications can be made with polyurethane dispersions, conventional polyurethane dispersions have sometimes been found to have insufficient physical or handling properties to make them a preferred material for such applications. Also, the use of a solvent can have adverse effects for some applications.

Polyurethanes are the reaction product of a polyalcohol and a polyisocyanate. Typically, the polyisocyanates used to prepare polyurethane dispersions have been aliphatic isocyanates such are disclosed in U.S. Pat. No. 5,494,960. Aromatic polyisocyanates such as toluene diisocyanate (TDI) and methylene diphenyldiisocyanate (MDI) as well as polymethylene polyphenylisocyanate are also known to be useful.

It is known to prepare polyurethane films by methods such as coagulation and casting. While these are commonly used, they are not without problems. For example, in coagulation processes, there is often a requirement for a step to remove coagulants from the films formed by means of washing or leaching. These steps often result in undesirable additional dewatering steps, undesirable waste streams and increased costs due to additional handling.

Accordingly, it would be desirable in the art of preparing polyurethane films from aqueous dispersions, to prepare such films which have physical and handling properties sufficient for their use in conventional film applications. It would be further desirable if such films could be prepared with dispersions which are, in turn, prepared in the absence of organic solvents. It would be even further desirable if such films could be prepared without undesirable extra steps.

SUMMARY OF THE INVENTION

In one aspect, the present invention is a process for preparing polyurethane films comprising electrodepositing the film onto a substrate from a polyurethane dispersion.

In another aspect, the present invention is a polyurethane film prepared with process which includes electrodepositing the film onto a substrate from a polyurethane dispersion.

One advantage of the electrodeposition process of the present invention is that there is no need for an additional step to remove coagulants from the films, as with conventional coagulation processes. Another advantage is that in using electrodeposition, the amount of water that must be removed during a dewatering step is minimized. A third advantage is that the resulting film demonstrates much greater uniformity in thickness as compare to films prepared by conventional coagulation techniques.

The present invention has applicability in, for example, gloves, condoms, medical bags, angioplasty balloons, medical bellows, face masks, blood pressure cuffs and the like. The present invention also has applicability in parts associated with drug delivery mechanisms, including catheters, medical tubing, gaskets and o-rings. Moreover, the present invention has applicability in many non-medical items, such as, for example, non-medical gloves, swim caps, tool handle grips, industrial caps and plugs, windshield wiper boots, toy balloons, toys, electrical parts, covers and gaskets.

DESCRIPTION OF THE PREFERRED EMBODIMENTS

The films of the present invention can be prepared from any polyurethane prepolymer dispersion which is sufficiently stable to be stored but not so stable that it cannot be electrodeposited. The dispersion can be prepared in any way which results in a dispersion which can be used to prepare a film having acceptable physical properties for the anticipated use of the film. The dispersions can be done by a batch process or by a continuous process. If done by a batch process, preferably, the dispersion in done by an inverse phase process wherein a small amount of water, including a small amount of anionic surfactant, is first added to a continuous prepolymer phase and mixed and then more water is added with mixing until the phase inverts.

When dispersions of the present invention are prepared by means of a continuous process, preferably they are prepared by means of a high internal phase ratio (HIPR) process. Such processes are known and are disclosed in, for Example, U.S. Pat. No. 5,539,021 to Pate, et al., and WO 98/41552 A1 to Jakubowski, et al. When prepared by either method, the resulting dispersion should have a particle size sufficient to make the dispersion stable. The dispersions of the present invention will have a particle size of from 0.9 to about 0.05, preferably from about 0.5 to about 0.07 and even more preferably, from about 0.4 to about 0.10 microns. Most preferably, the particle size of the dispersions of the present invention is about 0.15 microns.

The polyurethane dispersions of the present invention are prepared from a nonionic polyurethane prepolymer. The nonionic prepolymers of the present invention are prepared with an aliphatic or aromatic diisocyanate. Preferably, the diisocyanate is an aromatic diisocyanate selected from the group consisting of MDI, TDI and mixtures thereof. TDI can be generally used with any commonly available isomer distribution. The most commonly available TDI has an isomer distribution of 80 percent of the 2,4 isomer and 20 percent of the 2,6 isomer. For the purposes of the present invention, TDI with other isomer distributions can also be used, but often at significantly higher cost.

When MDI is used with the formulations of the present invention, it preferably has a P,P' isomer content of from about 99 percent to about 90 percent. Even more preferably, when MDI is used with the formulations of the present invention, it preferably has a P,P' isomer content of from about 98 to about 92 percent. Most preferably, when MDI is used with the formulations of the present invention, it preferably has a P,P' isomer content of about 94 percent. While MDI with such isomer distributions can be prepared by distillation during the MDI process, it can also be prepared by admixing commonly available products such as ISONATE 125M* and ISONATE 50OP*. (*ISONATE 125M and ISONATE 50OP are trade designations of The Dow Chemical Company.)

When mixtures of TDI and MDI are used to prepare the prepolymers of the present invention, they are admixed in a ratio of MDI to TDI of from about 99 percent MDI to about 80 percent MDI. More preferably, when mixtures of TDI and MDI are used to prepare the prepolymers of the present invention, they are admixed in a ratio of MDI to TDI of from about 98 percent MDI to about 90 percent MDI. Most preferably, when mixtures of TDI and MDI are used to prepare the prepolymers of the present invention, they are admixed in a ratio of MDI to TDI of about 96 percent MDI. Preferably the prepolymers of the present invention are prepared with MDI or mixtures of MDI and TDI. Even more preferably, the prepolymers of the present invention are prepared with MDI as the only aromatic diisocyanate.

In one embodiment of the present invention, the prepolymers of the present invention are prepared from a formulation that includes an active hydrogen containing material. In a preferred embodiment of the present invention, the active hydrogen containing material is a mixture of diols. One component of the diol mixture is a high molecular weight polyoxypropylene diol having an ethylene oxide capping of from 0 to 25 weight percent. The other component of the diol mixture is a low molecular weight diol. The polyether diols of the formulations of the present invention can be prepared by any method known to those of ordinary skill in the art of preparing polyether polyols to be useful for preparing such diols. Preferably, the polyether diols are prepared by the alkoxylation of a difunctional initiator in the presence of a basic catalyst. For example, a polyether useful with the present invention is a product resulting from a two step alkoxylation of ethylene glycol with first propylene oxide and then ethylene oxide, in the presence of KOH as a catalyst.

The high molecular weight polyether diol component of the diol mixture of the prepolymer formulations of present invention is a polyoxypropylene diol having an ethylene oxide capping of from 0 to 25 weight percent. Preferably, the molecular weight of this component is from about 1,000 to about 4,000, more preferably from about 1,200 to about 2,500, and most preferably from about 1,800 to about 2,200. As stated, the polyether diol is capped with from 0 to 25 percent ethylene oxide. Preferably, the high molecular weight diol is capped with from about 5 to about 25 percent ethylene oxide, and more preferably, from about 10 to about 15 percent ethylene oxide.

The low molecular weight diol component of some of the prepolymer formulations of the present invention can also be a product of alkoxylating a difunctional initiator. Preferably, this component is also a polyoxypropylene diol, but it can also be a mixed ethylene oxide propylene oxide polyol, as long as at least 75 weight percent of the alkoxides used, if present, is propylene oxide. Diols such as propylene glycol, diethylene glycol, dipropylene glycol, and the like, can also be used with the formulations of the present invention. The low molecular weight diol component of the prepolymer formulations, if present, has a molecular weight of from about 60 to about 750, preferably from about 62 to about 600, and most preferably, from about 125 to about 500.

The prepolymers of the present invention can be prepared in any way known to those of ordinary skill in the art of preparing polyurethane prepolymers to useful for preparing such prepolymers. Preferably the aromatic diisocyanate and polyether diol mixture are brought together and heated under reaction conditions sufficient to prepare a polyurethane prepolymer. The stoichiometry of the prepolymer formulations of the present invention is such that the diisocyanate is present in excess. Preferably, the prepolymers of the present invention have an isocyanate content (also known as % NCO) of from about 1 to about 9 weight percent, more preferably from about 2 to about 8 weight percent, and most preferably from about 3 to about 7 weight percent.

The prepolymers of the present invention are optionally extended with a difunctional amine chain extender when the active hydrogen containing material of the prepolymer formulation is a mixture of a low molecular weight diol and a high molecular weight polyether diol. The difunctional amine chain extender is not optional but required when the active hydrogen containing material of the prepolymer formulation is a high molecular weight polyether diol and does not include a low molecular weight diol. Preferably, the difunctional amine chain extender is present in the water used to make the dispersion. When used, the amine chain extender can be any isocyanate reactive diamine or amine having another isocyanate reactive group and a molecular weight of from about 60 to about 450, but is preferably selected from the group consisting of: an aminated polyether diols; piperazine, aminoethylethanolamine, ethanolamine, ethylenediamine and mixtures thereof. Preferably, the amine chain extender is dissolved in the water used to make the dispersion.

The prepolymers of the present invention are nonionic. There are no ionic groups incorporated in or attached to the backbones of the prepolymers used to prepare the films of the present invention. The anionic surfactant used to prepare the dispersions of the present invention is a external stabilizer and is not incorporated into the polymer backbones of the films of the present invention.

The prepolymers of the present invention are dispersed in water which contains a surfactant. Preferably the surfactant is an anionic surfactant. In the practice of preparing the dispersions of the present invention, the surfactant is preferably introduced into water prior to a prepolymer being dispersed therein, but it is not outside the scope of the present invention that the surfactant and prepolymer could be introduced into the water at the same time. Any anionic surfactant can be used with the present invention, but preferably the anionic surfactant is sodium dodecyl benzene sulfonate.

The dispersions of the present invention can have a solids level of from about 30 weight percent to about 60 weight percent. Films will not necessarily be prepared from dispersions having this level of solids. While the dispersions themselves will be stored and shipped at as high a solids content as possible to minimize storage volume and shipping costs, the dispersions can desirably be diluted prior to final use. The thickness of the film to be prepared will usually dictate what solids level is needed in the dispersion. When preparing films, the dispersions of the present invention can be at a weight percent solids of from 5 to about 60 percent, preferably from about 10 to about 40 percent, and, most preferably, from about 15 to about 25 weight percent when preparing examination gloves. Higher percent solids will generally result in a faster deposition rate using electrodeposition. For other applications, the film thickness and corresponding solids content of the dispersion used can vary.

For many film applications, it is necessary that the polymer used have physical properties similar to the more conventional materials used in those applications. For example, for an exam glove application, the films of the present invention can have a tensile set of less than 5%. One significant advantage of the films of the present invention over natural latex in applications such as exam gloves is that the films of the present invention have significantly lesser risk of inducing an allergic reaction in those wearing the gloves.

Another benefit of films of the present invention is that they can be prepared such that they are self-releasing. In the art of preparing exam gloves, this ability is also known as "powder free" in reference to the fact that such gloves are occasionally prepared and sold with a layer of talcum powder, corn starch, or the like, to keep the polymer from adhering to itself, thereby making it easier to put on the gloves. The films of the present invention can be made self releasing by inclusion of a wax in the prepolymer formulation. Preferably the wax is carnauba wax and the like. It is preferable that the wax to be used be selected from those that are not likely to induce an allergic reaction in skin that comes in contact therewith. Therefore, food grade waxes are particularly preferred for this application. When used, the waxes are preferably included in the water used to disperse the prepolymer formulation at a concentration of from about 0.1 to about 2 weight percent.

In addition to the waxes already mentioned, other additives can be included in the films of the present invention. Any additive which is known to those of ordinary skill in the art of preparing films from dispersion to be useful can be used with the films of the present invention so long as their presence does not degrade the properties of the film so much that the film is no longer fit for its intended purposes. The additives can also be incorporated into the films in any way known to be useful including, but not limited to inclusion in the prepolymer formulation and inclusion in the water used to make the dispersion. For example titanium dioxide is useful for coloring films of the present invention. Other useful additives include calcium carbonate, silicon oxide, defoamers, biocides, carbon particles, and the like.

In using electrodeposition to form the polyurethane films of the present invention, the dispersion particles are forced to move toward an electrode by applying an electric field to the dispersion. The particles collect at the electrode and form a deposit on the electrode. The electrodeposition can be followed with an optional densification step if desired. In the present invention, a substrate is made to have a charge by attaching the substrate to a power supply. Preferably, the substrate is made to have a positive charge, that is, it is made to be an anode. The substrate can be made of any anodic material that is stable, for example, does not produce metal ions. Suitable anodic materials include, for example, glass, ceramic materials, graphite, various stainless steels, antimony-doped tin oxide, and plastics which are unmodified or which are made sufficiently conductive through additives.

Film thickness can be controlled by varying such parameters as the percent solids in the dispersion, the applied voltage and the duration of treatment.

Selection of voltages used for electrodeposition should be selected such that the resulting film is of the thickness and quality required for the particular application. Generally, higher voltages result in faster deposition and thus thicker films. Preferably, the applied voltage is at least about 0.5V versus a Ag/AgCl reference electrode, more preferably at least about 2.0V, and most preferably at least about 4.0V.

As for the mode of deposition, "dead entry", "live entry" or "raised voltage" may be used. Dead entry is where the substrate is first placed into a bath containing the polyurethane dispersion, followed by application of the voltage. Live entry is where the substrate is lowered into the dispersion bath with the voltage already applied. Raised voltage is where the substrate is lowered into the bath at low or no voltage, and then the applied voltage is increased at a set rate until a desired set point is reached.

The time of application will depend upon the thickness desired, the dispersion concentration and the applied voltage. Generally, the longer the voltage is applied, the thicker the resulting film. The desired thickness will depend upon the end use application.

The current can be measured as the film is deposited on the substrate. A decrease in current indicates that a film is indeed being formed, thereby creating a resistance and lowering the current. The electrodeposition step can be followed by more conventional coating techniques, such as, for example, dip coating, if desired.

The following examples are for illustrative purposes only and are not intended to limit the scope of the claimed invention. Percentages are in weight percents unless otherwise stated.

EXAMPLES

The following materials are used in the examples below:
Polyether Polyol is a 2000 molecular weight polyoxypropylene diol having 12.5 percent ethylene oxide end capping.
Low Molecular Weight Diol is a 425 molecular weight all polyoxypropylene diol.
Polyisocyanate A is MDI having a 4,4' isomer content of 98 percent and an isocyanate equivalent weight of 125.
Polyisocyanate B is MDI having a 4,4' isomer content of 50 percent and an isocyanate equivalent weight of 125.
Surfactant is 22 percent solution of sodium dodecyl benzene sulfonate in water.
Diamine is a 230 molecular weight polyoxypropylene diamine.

Example 1

A polyurethane prepolymer is prepared by admixing 52.0 parts of Polyether Polyol and 14.7 parts of Low Molecular Weight Diol and then heating the admixture to 50° C. This material is then admixed with 29.1 parts of Polyisocyanate A and 4.2 part of Polyisocyanate B which has also been warmed to 50° C. A small amount of benzoyl chloride is added to neutralize residual base in the polyols. The admixture is then heated at 70° C. for 4 hours and then tested to determine NCO content. The NCO content is 5.84 percent.

A polyurethane dispersion is prepared by admixing 200 g of the prepolymer admixed with 13 g water and 28.5 g Surfactant using a high shear mixer running at about 2500 rpm. Additional water is slowly added until a phase inversion is observed. Additional water, including Diamine at a concentration of 0.15 NCO stoichiometry is added until the solids content is 46.6 percent.

A polyurethane film is prepared by immersing a nickel rod connected to the positive terminal of a 12 volt battery into the dispersion and then immersing a wire from the negative terminal into the dispersion. After 5 minutes, the nickel rod is removed and allowed to rest at ambient conditions for 5 minutes. The rod is then leached in a distilled water bath at ambient temperature for 5 minutes. The rod is then heated at 80° C. for 90 minutes. The film is then peeled from the rod and heated at 80° C. for an additional 30 minutes. A test specimen is prepared and tested according to using ASTM D 412-92. The results of the test are that the film has a tensile strength of 1782 psi; a stress at 100 percent elongation of 313 psi; and an elongation at break of 540 percent Examples 2–7

A polyurethane prepolymer is prepared by admixing 52.0 parts of Polyether Polyol and 14.7 parts of Low Molecular Weight Diol and then heating the admixture to 50° C. This material is then admixed with 29.1 parts of Polyisocyanate A and 4.2 part of Polyisocyanate B which has also been warmed to 50° C. A small amount of benzoyl chloride is added to neutralize residual base in the polyols. The admixture is then heated at 70° C. for 4 hours and then tested to determine NCO content. The NCO content is 5.84 percent.

A polyurethane dispersion is prepared by admixing 200 g of the prepolymer admixed with 13 g water and 28.5 g Surfactant using a high shear mixer running at about 2500 rpm. Additional water is slowly added until a phase inversion is observed. Additional water is added until the desired solids content is reached, as indicated in the table.

Transparent electrodes were fabricated from Sb-doped tin oxide coated glass. The voltage, as listed in the Table, was applied and measured versus a Ag/AgCl reference electrode. The counter electrode was a 1-inch by 1-inch Pt foil. The voltage was held for the amount of time listed in the table, during which time the polyurethane dispersion was allowed to deposit onto the electrode. After the deposition, the electrodes were drained for 2 minutes, then dried at 70° C. The resulting films were uniform, transparent films.

TABLE

| Example | Percent solids in dispersion | Voltage (v. Ag/AgCl reference) | Duration of treatment (minutes) | Weight gain (mg) |
| --- | --- | --- | --- | --- |
| 2 | 5 | +2.0 | 2 | 2.3 |
| 3 | 46 | +2.0 | 2 | 70 |
| 4 | 46 | +2.0 | 2 | 70 |
| 5 | 46 | +2.0 | 5 | 100 |
| 6 | 46 | +2.0 | 2 | 57 |
| 7 | 46 | +4.0 | 2 | 74 |

Example 8

A 1 inch by 1 inch electrode was fabricated from stainless steel. The front face was shotblasted with glass beads to create a surface of uniform roughness. The electrode was placed in a dispersion having 5% solids. The potential of the electrode was held at +2.0V versus a Ag/AgCl reference electrode. The counter electrode was a 1 inch by 1 inch Pt foil. The initial current was 2.7 mA. This decreased slowly to 1.2 mA over the 60 minute run. The film was then dried at 70° C.

What is claimed is:

1. A process for preparing a polyurethane film comprising:
    electrodepositing the film onto a substrate from a polyurethane dispersion; and removing the film from the substrate.

2. The process of claim 1 wherein the electrodepositing further comprises
    applying a voltage of at least 0.5V to the substrate, relative to a Ag/AgCl reference electrode; and
    allowing the polyurethane dispersion to deposit onto the substrate.

3. The process of claim 1, wherein the dispersion is formed in a two or more step process wherein,
    (1) in a first step a nonionic prepolymer is formed and, in a subsequent step,
    (2) an aqueous dispersion of the prepolymer is formed, in the presence of an anionic surfactant, both steps occurring in the substantial absence of an organic solvent.

4. The process of claim 3 wherein the prepolymer is prepared from a polyurethane prepolymer formulation including a diisocyanate and an active hydrogen containing material.

5. The process of claim 4 wherein the diisocyanate is either:
    (a) an aliphatic diisocyanate; or
    (b) an aromatic diisocyanate selected from the group consisting of MDI, TDI, and mixtures thereof; and
wherein the active hydrogen containing material is either:
    (a) a mixture of a high molecular weight diol and a low molecular weight diol; or
    (b) a high molecular weight diol, wherein when the active hydrogen containing material does not include a low molecular weight diol, the prepolymer is dispersed in water which includes a difunctional amine chain extender.

6. The process according to claim 1 wherein the dispersion has a particle size of from 0.9 microns to 0.05 microns.

7. The process according to claim 1 wherein the dispersion has a solids content of from 5 to 60 weight percent.

8. A process for preparing a polyurethane film shaped for use in a medical application, said process comprising:
    (A) exposing a substrate having a shape suitable for making a film for a medical application to a polyurethane dispersion, said dispersion comprising a nonionic polyurethane prepolymer and an anionic surfactant and being substantially free of organic solvent;
    (B) electrodepositing said dispersion onto said substrate to form a film on said substrate; and
    (C) removing said film from said substrate to form a film shaped for said medical application.

9. The process of claim 8, wherein said polyurethane film shaped for use in a medical application is a glove, a condom, a medical bag, an angioplasty balloon, or a catheter.

10. The process of claim 8, wherein said polyurethane film shaped for use in a medical application is a glove and said substrate is glove shaped.

11. The process of claim 8, wherein said electrodepositing comprises:
    applying a voltage of at least 0.5V to the substrate, relative to a Ag/AgCl reference electrode; and
    allowing said polyurethane dispersion to deposit onto said substrate.

\* \* \* \* \*